(12) United States Patent
Mori et al.

(10) Patent No.: US 9,264,560 B2
(45) Date of Patent: Feb. 16, 2016

(54) CAUSE IDENTIFYING DEVICE, IMAGE FORMING DEVICE, AND NON-TRANSITORY COMPUTER-READABLE MEDIUM

(71) Applicant: FUJI XEROX CO., LTD., Tokyo (JP)

(72) Inventors: Kenji Mori, Kanagawa (JP); Jun Koyatsu, Kanagawa (JP); Shinsuke Sugi, Kanagawa (JP); Toshio Koriyama, Kanagawa (JP); Yoshiki Matsuzaki, Kanagawa (JP); Shinji Tabata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/310,638

(22) Filed: Jun. 20, 2014

(65) Prior Publication Data

US 2015/0103382 A1    Apr. 16, 2015

(30) Foreign Application Priority Data

Oct. 10, 2013    (JP) ................................. 2013-212882

(51) Int. Cl.
*H04N 1/00* (2006.01)
*H04N 1/60* (2006.01)
*G06K 15/02* (2006.01)

(52) U.S. Cl.
CPC ....... *H04N 1/00087* (2013.01); *H04N 1/00005* (2013.01); *H04N 1/00015* (2013.01); *H04N 1/6038* (2013.01); *H04N 1/6041* (2013.01); *H04N 2201/0094* (2013.01)

(58) Field of Classification Search
USPC ................. 358/3.24, 442, 443, 400, 401, 406
See application file for complete search history.

(56) References Cited

U.S. PATENT DOCUMENTS

| 5,910,849 A | * | 6/1999 | Tamagaki | .......... H04N 1/00962 358/401 |
| 2013/0148143 A1 | * | 6/2013 | Ooyanagi | .......... H04N 1/00015 358/1.12 |

FOREIGN PATENT DOCUMENTS

JP    A-2005-277762    10/2005

* cited by examiner

*Primary Examiner* — Quang N Vo
(74) *Attorney, Agent, or Firm* — Oliff PLC

(57) ABSTRACT

A cause identifying device includes a modifying unit and an identifying unit. The modifying unit, in a case in which an inexpedience is detected in an image formed on a print medium by conducting multiple processes, modifies processing content conducted during the image formation by modifying a processing parameter of a partial process or disabling a partial process. The identifying unit identifies a cause of the inexpedience on the basis of information obtained from an image formed on a print medium by image formation conducted after the processing content is modified.

8 Claims, 11 Drawing Sheets

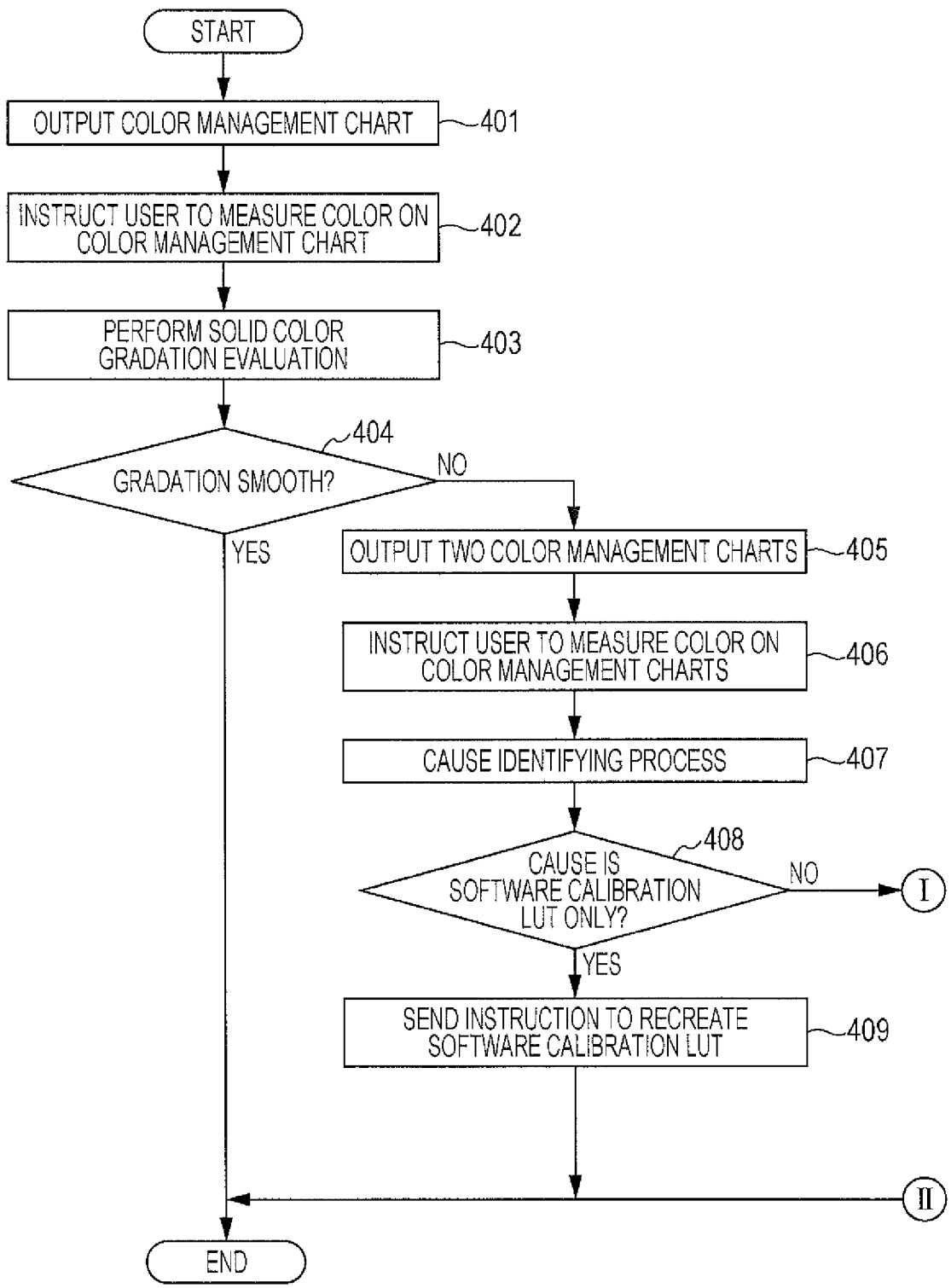

FIG. 10

| | CLASSIFICATION | |
|---|---|---|
| | 1ST COLOR MANAGEMENT CHART (1ST COLOR MEASUREMENT DATA) | 2ND COLOR MANAGEMENT CHART (2ND COLOR MEASUREMENT DATA) |
| SOFTWARE CALIBRATION LUT | OFF | ON |
| HARDWARE CALIBRATION LUT | ON | OFF |
| RESULT 1 | NO | YES |
| RESULT 2 | YES | NO |
| RESULT 3 | NO | NO |

PRESENCE OF TONE JUMP

RESULT 1: CAUSE IS SOFTWARE CALIBRATION LUT
RESULT 2: CAUSE IS HARDWARE CALIBRATION LUT
RESULT 3: CAUSE IS INTERFERENCE BETWEEN SOFTWARE CALIBRATION LUT AND HARDWARE CALIBRATION LUT

CAUSE IDENTIFYING DEVICE, IMAGE FORMING DEVICE, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2013-212882 filed Oct. 10, 2013.

BACKGROUND

Technical Field

The present invention relates to a cause identifying device, an image forming device, and a non-transitory computer-readable medium.

SUMMARY

According to an aspect of the invention, there is provided a cause identifying device that includes a modifying unit and an identifying unit. The modifying unit, in a case in which an inexpedience is detected in an image formed on a print medium by conducting multiple processes, modifies processing content conducted during the image formation by modifying a processing parameter of a partial process or disabling a partial process. The identifying unit identifies a cause of the inexpedience on the basis of information obtained from an image formed on a print medium by image formation conducted after the processing content is modified.

BRIEF DESCRIPTION OF THE DRAWINGS

Exemplary embodiments of the present invention will be described in detail based on the following figures, wherein:

FIGS. 8A and 8B are a flowchart illustrating another example of a process performed during image quality evaluation;

FIG. 10 is a diagram for illustrating details of the cause identifying process performed in step 407.

DETAILED DESCRIPTION

Hereinafter, exemplary embodiments of the invention will be described with reference to the attached drawings.

Figure 1:
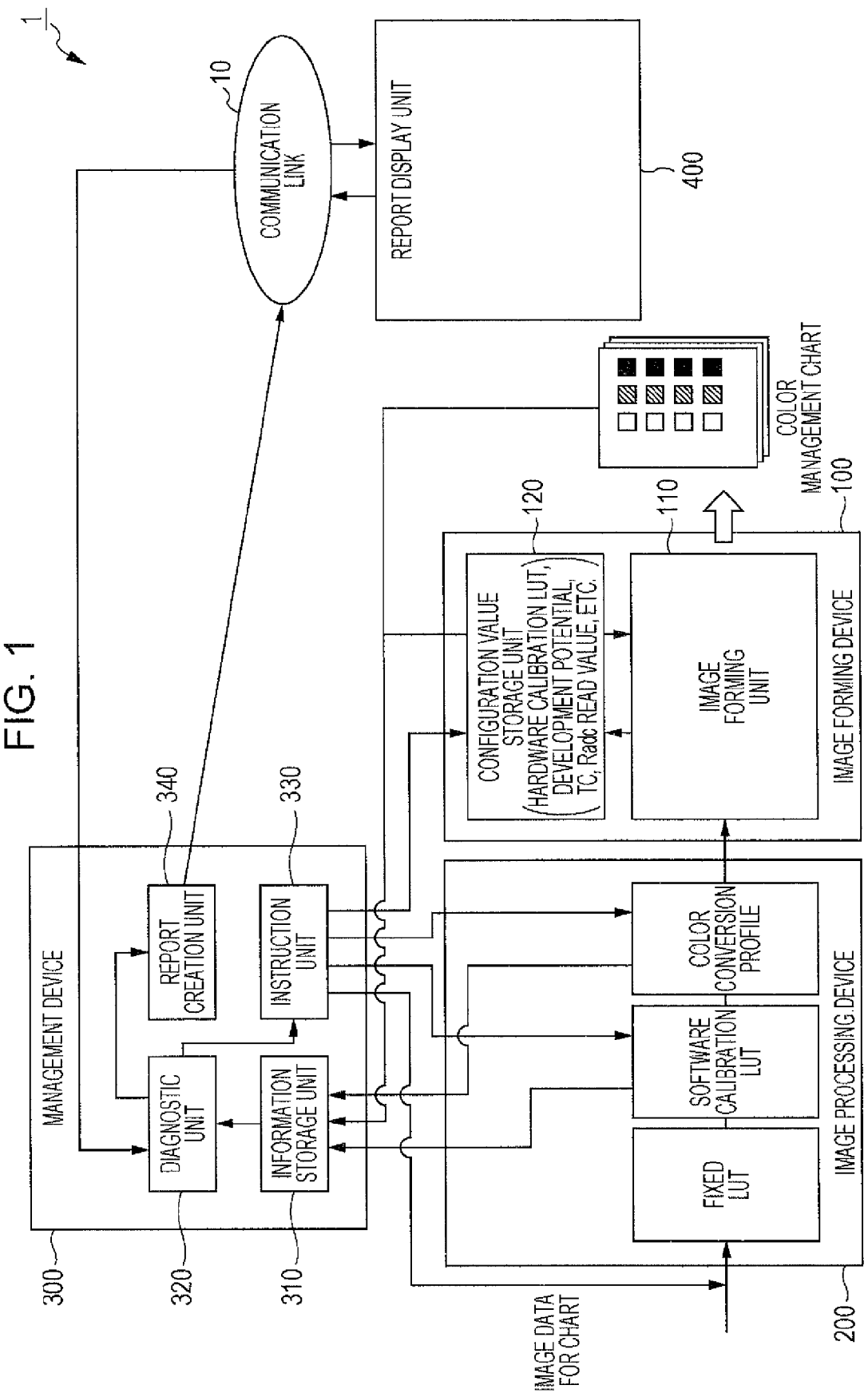
FIG. 1 is a diagram illustrating a configuration of an image forming system applying an exemplary embodiment.

FIG. 1 is a diagram illustrating a configuration of an image forming system 1 applying an exemplary embodiment.

As illustrated in FIG. 1, the image forming system 1 according to the present exemplary embodiment is provided with an image forming device 100 that forms a color image on a print medium such as a paper sheet according to an electrophotographic system.

Also provided is an image processing device 200 that performs predetermined image processing on image data transmitted from a personal computer (PC) or the like (not illustrated), and then outputs this image data to the image forming device 100. Furthermore, in the present exemplary embodiment, there is provided a management device 300, made up of a PC or the like, that manages the image forming device 100 and the image processing device 200. Also provided is a report display unit 400 connected to the management device 300 via a communication link (public communication link) 10.

Note that the management device 300 may be provided beside the image forming device 100 and the image processing device 200, but may also be provided at a remote location distanced from the image forming device 100 and the image processing device 200, and the image forming device 100 and the image processing device 200 may be connected to the management device 300 via the communication link 10.

Additionally, the management device 300 may be built into the image forming device 100, and be made to function as one functional unit among multiple functional units included in the image forming device 100. Likewise, the image processing device 200 also may be built into the image forming device 100, and be made to function as one functional unit among multiple functional units included in the image forming device 100.

The image forming device 100 is provided with an image forming unit 110 that forms an image on a print medium such as a paper sheet by using an electrophotographic system. In an electrophotographic system, an image is formed on a paper sheet using a photoreceptor drum, a charging device, an exposure device, a developing device, an intermediate transfer body, and the like.

In addition, the image forming device 100 is equipped with a configuration value storage unit 120 that records a preset configuration value. The configuration value storage unit 120 stores various configuration values used in image formation, such as the development potential and a hardware calibration lookup table (LUT) used for image quality adjustment (details discussed later). Note that the hardware calibration LUT is generated on the basis of scanned data obtained by scanning a patch image created on the intermediate transfer body of the image forming unit 110.

The image processing device 200 is equipped with a storage unit (not illustrated) made up of a hard disk drive or the like. Additionally, this storage unit stores a fixed LUT and a software calibration LUT used for image quality adjustment, as well as a color conversion profile used when converting image data into image data in a different color space. Note that the fixed LUT is an LUT stored in the storage unit at the time of factory shipment, and is not expected to be updated. Meanwhile, the software calibration LUT is an updateable LUT that is updated according to a scanned result of a color management chart discussed later, or a specialized correction chart.

Herein, the image processing device 200 processes input image data using the fixed LUT, software calibration LUT, and color conversion profile, and outputs the processed image data to the image forming device 100.

The management device 300 is equipped with an information storage unit 310, a diagnostic unit 320, an instruction unit 330, and a report creation unit 340.

The information storage unit 310 stores information such as the software calibration LUT and color conversion profile transmitted from the image processing device 200, as well as scanned data (color measurement data) of a color management chart (details discussed later). The diagnostic unit 320, on the basis of information stored in the information storage unit 310, conducts a predetermined diagnostic process (a process for identifying the cause of an image quality inexpedience). The diagnostic process will be discussed in detail later.

Also, the instruction unit 330 gives instructions to the image processing device 200 and the image forming device 100. The report creation unit 340 creates a report on the basis of a diagnostic result output from the diagnostic unit 320, and transmits the report to the report display unit 400. The content of the report created by the report creation unit 340 is then displayed on the report display unit 400.

Note that the above functional units included in the management device 300 may each be realized by the cooperative action of software and hardware resources. Specifically, programs such as an operating system, or application software that executes the specific function of each component in cooperation with an operating system, are stored in a storage device such as ROM or a hard disk drive. Additionally, by having a CPU load these programs from ROM or the like into a memory device such as RAM, the respective functional units of the diagnostic unit 320, the instruction unit 330, and the report creation unit 340 are realized. In addition, the information storage unit 310 is realized by the memory device.

Note that a program executed by the CPU may be provided in a recorded state on a computer-readable recording medium, such as a magnetic recording medium (such as magnetic tape or a magnetic disk), an optical recording medium (such as an optical disc), a magneto-optical recording medium, or semiconductor memory. In addition, such a program may also be downloaded to the management device 300 using the communication link 10.

Meanwhile, in the present exemplary embodiment, in order to maintain the quality of images formed on paper sheets by the image forming device 100, a color management chart is output by the image forming device 100 at predetermined timings. Subsequently, the color management chart is scanned, and image quality is evaluated on the basis of the scanned result and a predetermined target value. Furthermore, in the image forming system 1 according to the present exemplary embodiment, when the image quality does not meet a predetermined quality (when an inexpedience is detected in the image), the cause of the lowered image quality is identified.

Note that the image data acting as the basis of the color management chart (hereinafter designated as the "chart image data" in some cases) is first processed by the image processing device 200, and then supplied to the image forming device 100.

Described more fully, the chart image data is supplied from the instruction unit 330 of the management device 300 to the image processing device 200, and then the image processing device 200 uses the fixed LUT, software calibration LUT, and color conversion profile to process this chart image data. Subsequently, the processed chart image data is output to the image forming device 100, and a color management chart is formed on a paper sheet on the basis of the processed chart image data.

Figure 2:
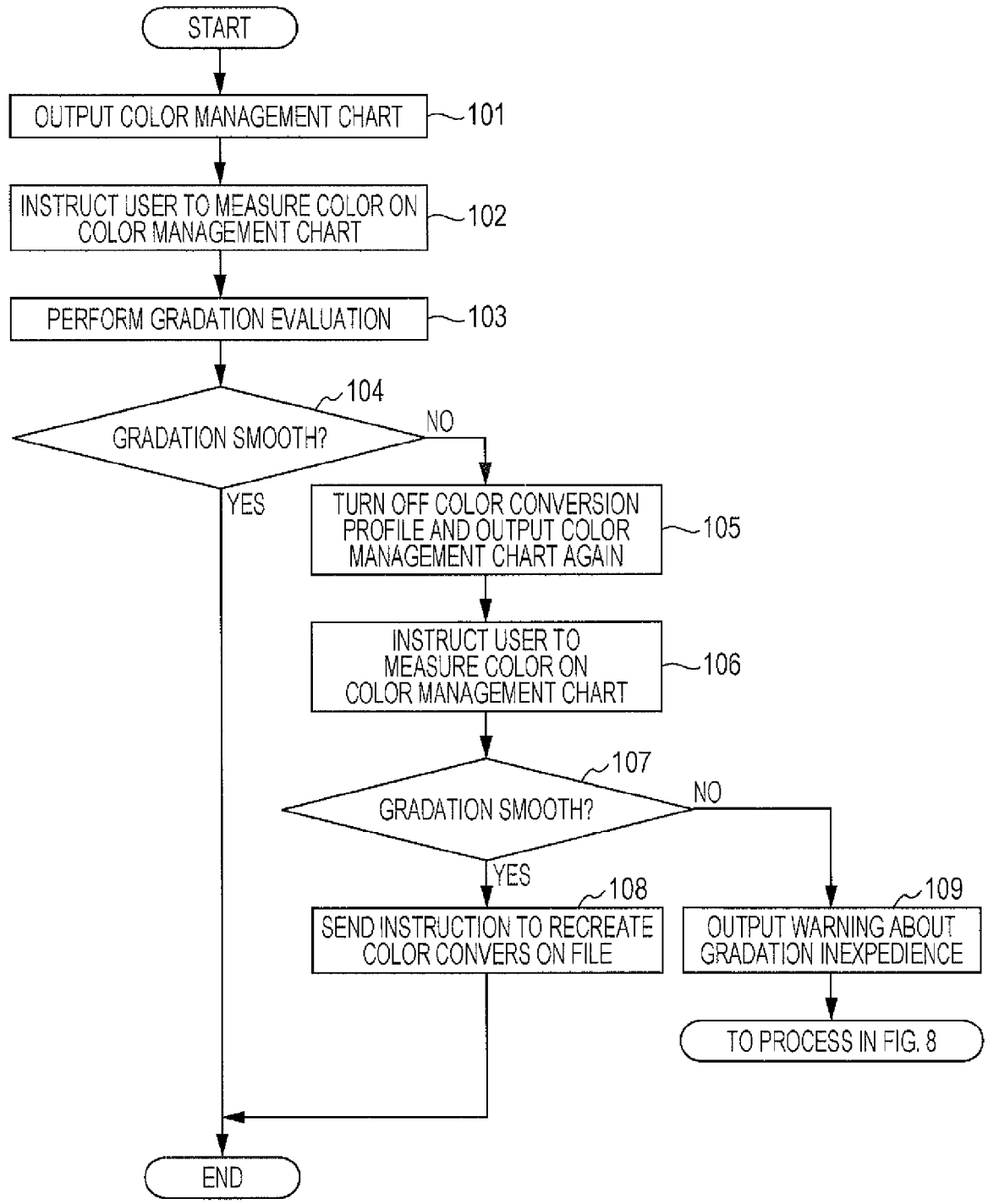
FIG. 2 is a flowchart illustrating a flow of a process performed when evaluating the quality of an image.

FIG. 2 is a flowchart illustrating a flow of a process performed when evaluating the quality of an image.

In this process, first, a color management chart on which multiple patches (rectangular images) of mutually different image densities are formed (see FIG. 1) is output by the image forming device 100 (step 101). Subsequently, a user is instructed, via a user interface (UI) such as a monitor (not illustrated) provided in the image forming device 100 or the like, to perform color measurement on each patch on the color management chart (step 102). Note that an image scanning unit may also be provided internally to the image forming device 100, and by using this image scanning unit, the patches on the color management chart may be automatically scanned.

Next, the diagnostic unit 320 of the management device 300 evaluates gradation on the basis of the color measurement data obtained from the color measurement by the user (step 103), and judges whether or not the gradation is smooth (step 104). Specifically, the diagnostic unit 320 checks the amount of change in image density between respective patches, and judges whether or not the amount of change is within a predetermined range, for example.

Described in further detail, in the present exemplary embodiment, when forming a color management chart on a paper sheet, multiple patches are arranged in a line, for example, with the image density of each patch gradually changed going in the downstream direction of the line of patches, thus forming a gradation image on the color management chart. Subsequently, in the processing of step 103 and step 104, the diagnostic unit 320 checks the amount of change in image density between adjacent patches, and judges whether or not the amount of change is within a predetermined range, for example.

Figure 3:
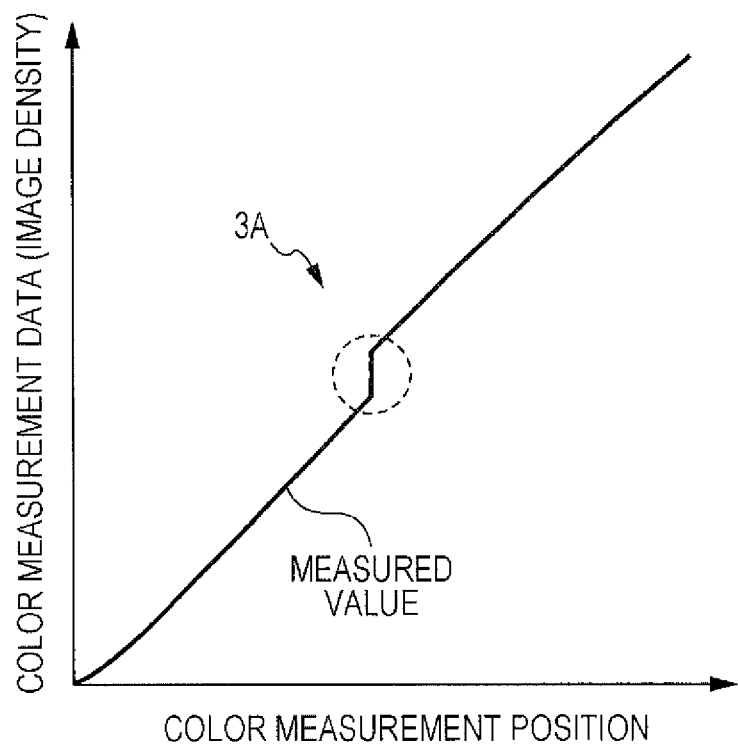
FIG. 3 is a diagram illustrating color measurement data.

Subsequently, in step 104, the process ends in the case of judging that the gradation is smooth. On the other hand, the process proceeds to step 105 in the case of judging that the gradation is not smooth. Herein, FIG. 3 (a diagram illustrating color measurement data) illustrates color measurement data of a color management chart in the case of judging that the gradation is not smooth. In the case of judging that the gradation is not smooth, the output value (measured value) in the color measurement data changes suddenly (a tone jump occurs), as indicated by the sign 3A.

The processing in step 105 and thereafter will now be described.

In the processing of step 105, the color conversion profile is first turned off (color conversion using the color conversion profile is configured to not be conducted), and another color management chart is output. Note that turning off the color conversion profile is realized by transmitting an instruction signal for turning off the color conversion profile from the instruction unit 330 of the management device 300 (an example of a cause identifying device) to the image processing device 200, such that the image processing device 200 sets the color conversion profile to off.

Subsequently, the user is instructed via the UI to measure the color of each patch on the color management chart, similarly to the above step 102 (step 106). After that, the diagnostic unit 320 again judges whether or not the gradation is smooth (step 107).

Then, in step 107, in the case of judging that the gradation is smooth, the diagnostic unit 320 judges that the cause is in the color conversion profile. Subsequently, the instruction unit 330 outputs an instruction to recreate the color conversion profile (step 108). In other words, in step 108, the diagnostic unit 320 that functions as an identifying unit identifies the color conversion profile as the cause of the tone jump. In this case, the instruction unit 330 outputs an instruction to create the color conversion profile.

As a result, the color conversion profile is recreated. On the other hand, in step 107, in the case of judging that the gradation is not smooth, the diagnostic unit 320 judges that the cause is not the color conversion profile. In this case, the instruction unit 330 outputs a warning about a tone inexpedience (step 109). Note that in the present exemplary embodiment, when the processing in step 109 is conducted, the process illustrated in FIGS. 8A and 8B (discussed later) is subsequently conducted.

Another process example will be described.

Figure 4:
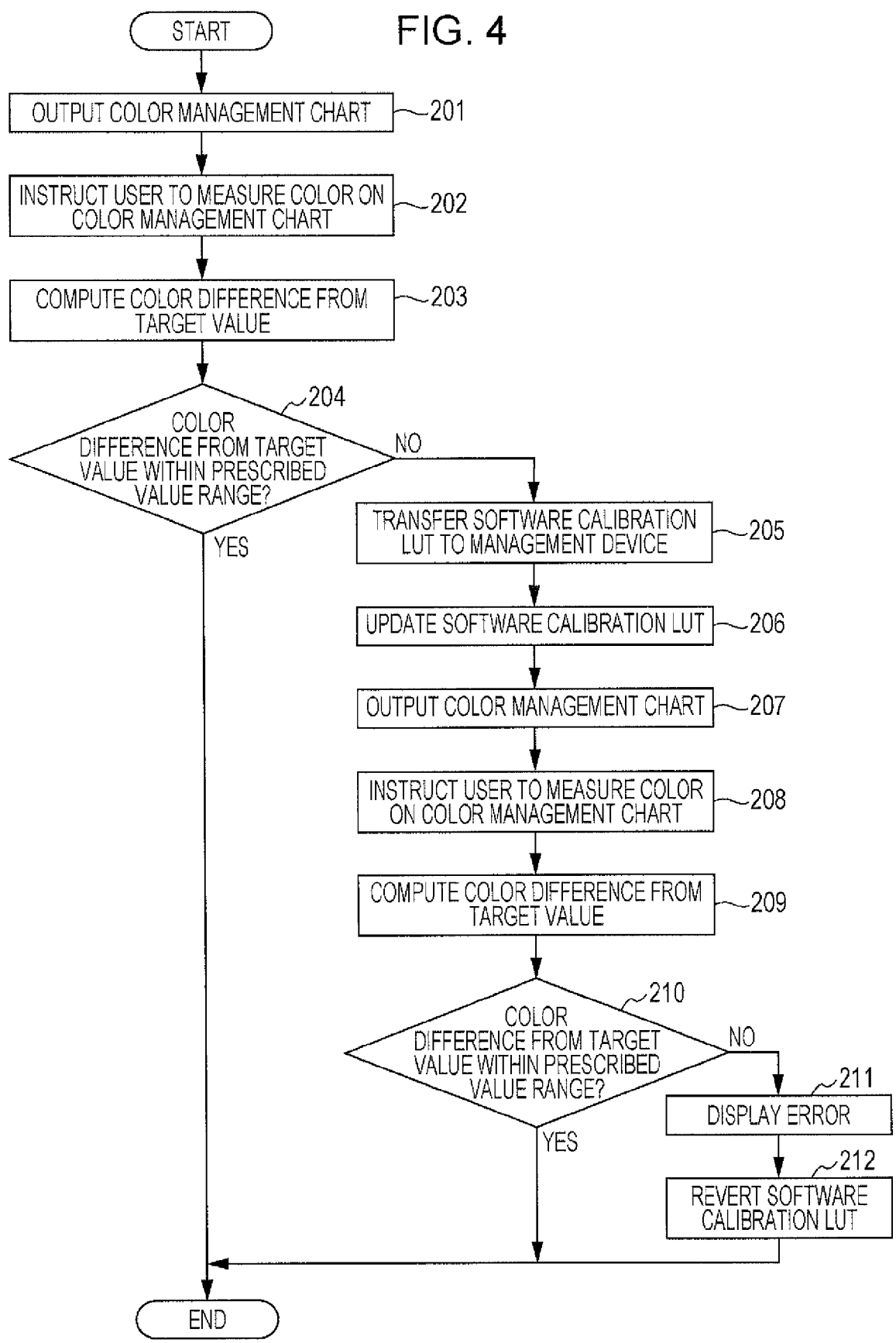
FIG. 4 is a flowchart illustrating another example of a process performed during image quality evaluation.

FIG. 4 is a flowchart illustrating another example of a process performed during image quality evaluation.

In this example, similarly to the above, first, the image forming device 100 outputs a color management chart, on which are formed multiple patches whose image densities are mutually different and also vary by a fixed proportion proceeding in the downstream direction of the line of patches (step 201).

Figure 5:
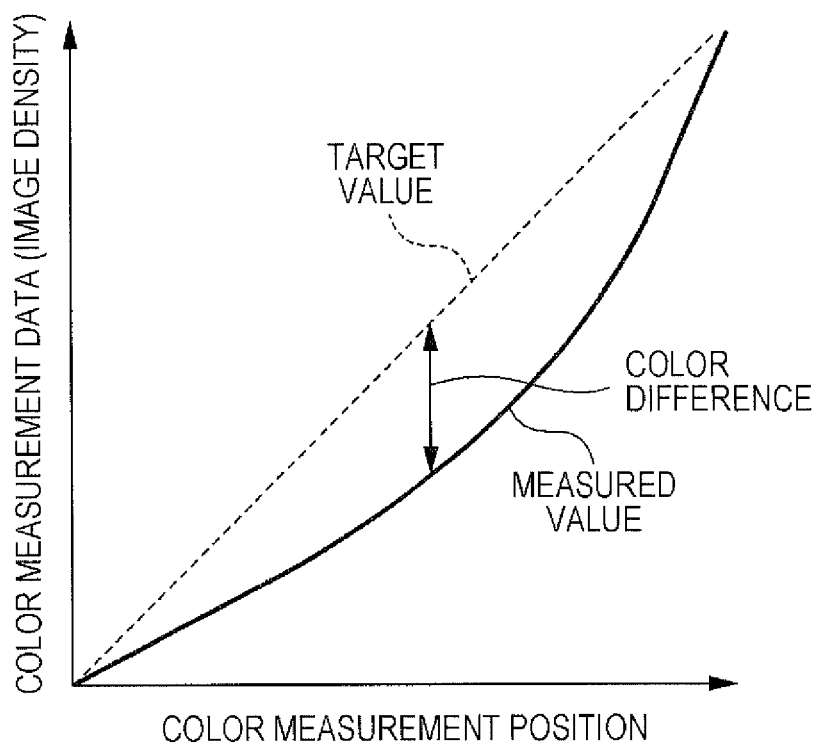
FIG. 5 is a diagram illustrating color measurement data and a target value.

Subsequently, similarly to the above, the user is instructed via the UI to measure the color of each patch on the color management chart (step 202), and color measurement data (color measurement values) are obtained. After that, the diagnostic unit 320 computes the color difference from a target value (step 203). Specifically, as illustrated in FIG. 5 (a diagram illustrating color measurement data and a target value), the difference between a predetermined target value and the color measurement data (measured values) is computed.

Subsequently, in the present exemplary embodiment, the diagnostic unit 320 judges whether or not the color difference computed in step 203 is within a predetermined, prescribed range (step 204). If the color difference is within the prescribed range, there is no particular in expedience, and thus the process ends. On the other hand, if the color difference is not within the prescribed range, the software calibration LUT stored in the image processing device 200 is transferred to the management device 300 (step 205).

Subsequently, in the management device 300, the diagnostic unit 320 updates the software calibration LUT to a new software calibration LUT (step 206). Note that this update is conducted so as to decrease the above color difference between the color measurement data and the target value. After the software calibration LUT is updated, the updated software calibration LUT is transmitted to the image processing device 200 via the instruction unit 330, and the new software calibration LUT is stored in the image processing device 200.

Subsequently, in the present exemplary embodiment, a color management chart is output again with the use of the new software calibration LUT (step 207). In other words, the color management chart is output again under processing conditions that differ from the processing conditions that were in place when the first color management chart (the color management chart output in step 201) was output.

Subsequently, similarly to the above, the user is instructed to measure the color of each patch on the color management chart again (step 208). Next, the diagnostic unit 320 computes the color difference from the target value, similarly to step 203 (step 209). After that, the diagnostic unit 320 judges whether or not the color difference computed in step 209 is within a predetermined, prescribed range, similarly to the above step 204 (step 210). In the case of judging in step 210 that the color difference is within the prescribed range, the process ends.

On the other hand, in the case of judging in step 210 that the color difference computed in step 209 is outside the predetermined, prescribed range, a judgment result indicating that the color difference is outside the prescribed range is transmitted from the instruction unit 330 to the image forming device 100 or the like, and an error is then displayed via a UI or the like provided in the image forming device 100 or the like (step 211).

Also, in this case, the pre-update software calibration LUT (the software calibration LUT from before the update conducted in step 206) is transmitted from the instruction unit 330 to the image processing device 200, and in the image processing device 200, a process that reverts the updated software calibration LUT to the pre-update software calibration LUT (the original software calibration LUT) is conducted (step 212).

At this point, the software calibration LUT is updated so as to decrease the color difference between the target value and the color measurement data, as described earlier. For this reason, if the color difference is still outside the prescribed range even after updating the software calibration LUT (a judgment of NO in step 210), the cause is less likely to be the software calibration LUT, and there is an increased likelihood of another factor being the cause. For example, there is an increased likelihood that a factor such as sudden color variation in the image forming unit 110 or a mistake when measuring color on the color management chart is the cause.

For this reason, in the present exemplary embodiment, in the case in which the color difference is still outside the prescribed range even after using the updated software calibration LUT, the software calibration LUT is not treated as the cause, an error is displayed, and in addition, the updated software calibration LUT is reverted back to the pre-update software calibration LUT.

Yet another process example will be described.

Figure 6:
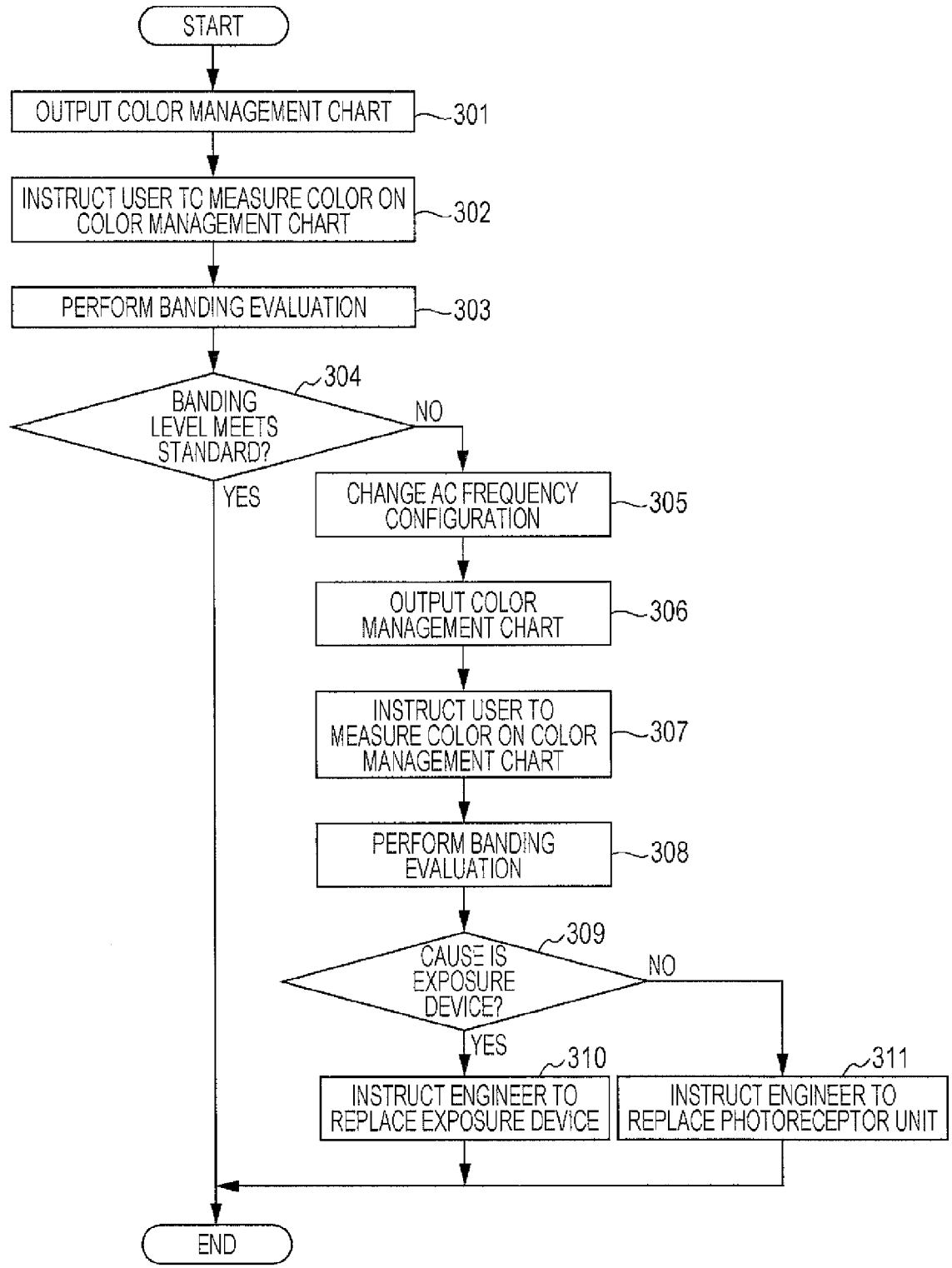
FIG. 6 is a flowchart illustrating another example of a process performed during image quality evaluation.

FIG. 6 is a flowchart illustrating another example of a process performed during image quality evaluation.

In this process, similarly to the above, first, the image forming device 100 outputs a color management chart on which multiple patches are formed (step 301). Subsequently, similarly to the above, the user is instructed via the UI to measure the color of each patch on the color management chart (step 302), and color measurement data (color measurement values) are acquired.

After that, in this process, the diagnostic unit 320 evaluates banding (step 303), and if banding has occurred, judges whether or not the banding level meets a predetermined standard (step 304). In the case of judging that the banding level does meet the predetermined standard, the process ends. Note that banding refers to an unevenness (uneven density) occurring at fixed intervals on an image.

Figure 7A:
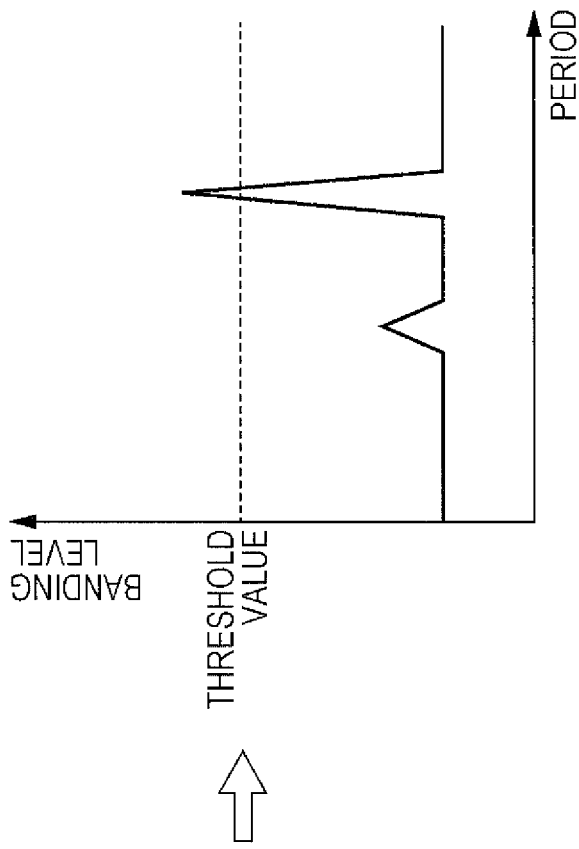
FIGS. 7A and 7B are diagrams illustrating an FFT analysis result obtained by conducting FFT analysis on a scanned result of a color management chart.

On the other hand, in the case of judging in step 304 that the banding level does not meet the predetermined standard, the process proceeds to step 305. Herein, FIG. 7A illustrates an FFT analysis result obtained by conducting FFT analysis on a scanned result of a color management chart (color measurement result). In the present exemplary embodiment, the judgment of whether or not the banding level meets the predetermined standard is made on the basis of this FFT analysis result.

Specifically, as illustrated in FIG. 7A, in the case in which some of the output values obtained from the FFT analysis result exceed a predetermined threshold value, the banding level is judged to not meet the predetermined standard, whereas in the case in which the output values obtained from the FFT analysis result do not exceed the predetermined threshold value, the banding level is judged to meet the predetermined standard.

The processing in step 305 and thereafter will now be described.

In the processing of step 305, a process is conducted to modify the frequency of the alternating current component (AC component) of the voltage applied to the photoreceptor drum by the charging device. In other words, in step 305, first, the instruction unit 330 that functions as a modifying unit instructs the image forming device 100 to modify the frequency of the AC component of the voltage. In response, the image forming device 100 modifies the frequency of the AC component of the voltage.

Additionally, in the present exemplary embodiment, after the processing in step 305, a color management chart is output again (step 306), and subsequently, the user is instructed via the UI to measure the color of each patch on the color management chart (step 307). After that, the banding evaluation is conducted again (step 308). Specifically, the FFT analysis described earlier is conducted.

Subsequently, in the present exemplary embodiment, the diagnostic unit 320, on the basis of the FFT analysis result, judges whether or not the cause of the banding is in the exposure device installed in the image forming device 100 (step 309). Described more specifically, in the present exemplary embodiment, installed inside the image forming device 100 is an exposure device that uses a rotating polygon mirror to radiate light and expose a photoreceptor drum whose surface has been uniformly charged by the charging device. A judgment is made on whether or not the cause of the banding is in this exposure device.

Figure 7B:
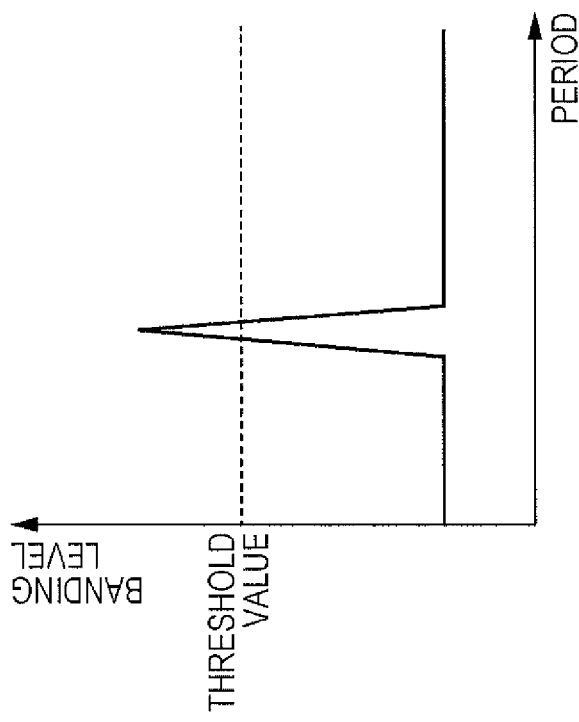

To describe in further detail with reference to FIGS. 7A and 7B, in the case in which the cause is not in the exposure device but instead in the charging device, if the frequency of the AC component of the voltage is modified as above, the position of the peak in the output values obtained from the FFT analysis result (the position in the horizontal direction of the drawings) varies according to the modification. In such a case, it is judged that the cause of the banding is in the charging device, and not in the exposure device. On the other hand, if the position of the peak in the output values does not vary even if the frequency of the AC component of the voltage is modified, it is judged that the cause is in the exposure device.

At this point, the exposure period when the exposure device conducts exposure may sometimes be close to the frequency of the AC component of the voltage. In this case, the position of the above peak produced due to the exposure device may overlap the position of the above peak produced due to the charging device, and appear as a single peak. In such a case, distinguishing whether the cause of the banding is in the exposure device or the charging device becomes difficult. If a process to modify the frequency of the AC component of the voltage is conducted as in the present exemplary embodiment, the cause of the banding may be identified even under such conditions.

Note that although the case of modifying the frequency of the AC component of the voltage is described as an example in the process illustrated in FIGS. 6, 7A, and 7B, the amplitude (magnitude) of the AC component of the voltage may also be modified. In this case, the cause may be judged to be in the exposure device in the case in which the peak output value does not vary, and the cause may be judged to be in the charging device in the case in which the peak output value does vary. Also, although the case of identifying the cause of an image quality inexpedience by modifying an operating parameter of a partial mechanism (the charging device) from among multiple mechanisms constituting the image forming unit 110 is described as an example in the process illustrated in FIGS. 6, 7A, and 7B, the cause of an image quality inexpedience may be identified by not only modifying an operating parameter, but also by suspending operation of the partial mechanism.

Next, the processing in step 310 and thereafter will be described.

In the case of judging in step 309 that the cause is in the exposure device, the processing in step 310 is executed. In step 310, an engineer is instructed to replace the exposure device. More specifically, the report creation unit 340 and the report display unit 400 are used to instruct the engineer to replace the exposure device.

On the other hand, in the case of not judging in step 309 that the cause is in the exposure device, the processing in step 311 is executed. In step 311, an engineer is instructed to replace the photoreceptor unit. The charging device is also built into the photoreceptor unit, and thus if the photoreceptor unit is replaced, the charging device is also replaced.

Yet another process example will be described.

Figure 8B:
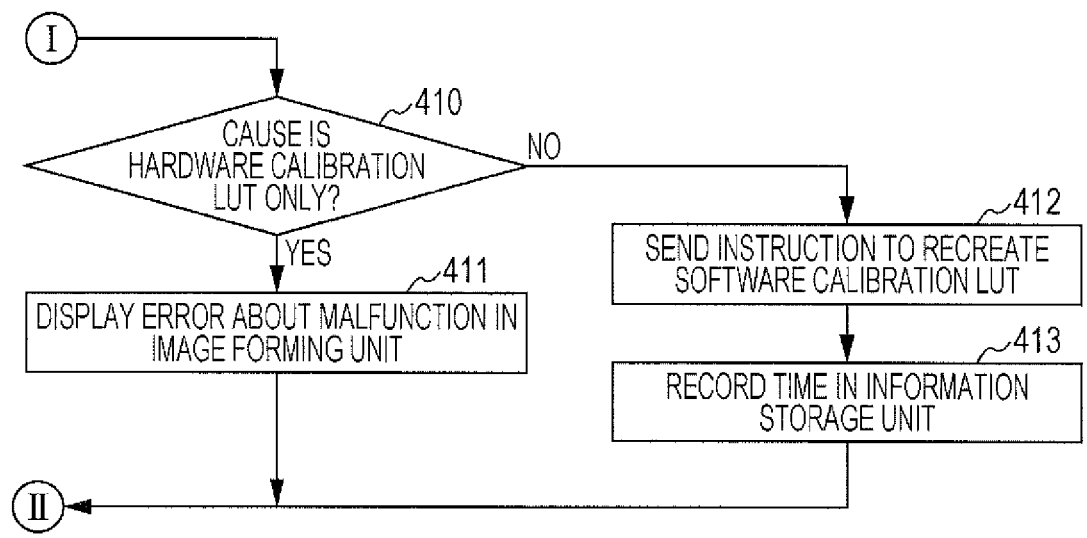

FIGS. 8A and 8B are a flowchart illustrating another example of a process performed during image quality evaluation.

In this process, similarly to the above, first, the image forming device 100 outputs a color management chart on which multiple patches are formed (step 401). Note that in the present exemplary embodiment, the color conversion profile is first turned off (image processing using the color conversion profile is configured to not be conducted), and a color management chart is output.

As a result, a solid-color color management chart may be generated more reliably. For example, even in the case of attempting to output a color management chart for a single color (a solid color, such as 100% cyan), if the color conversion profile is in an ON state, the color-converted image data may contain color components with two or more colors, and a single color (solid color) color management chart may not be generated. If the color conversion profile is turned off as in the present exemplary embodiment, a color management chart for a single color may be generated more reliably.

After that, in this process, similarly to the above, the user is instructed via the UI to measure the color of each patch on the color management chart (step 402), and color measurement data (color measurement values) are acquired. Next, similarly to the above, the diagnostic unit 320 evaluates the gradation on the basis of the color measurement data acquired in step 402 (step 403), and judges whether or not the gradation is smooth (step 404).

Figure 9:
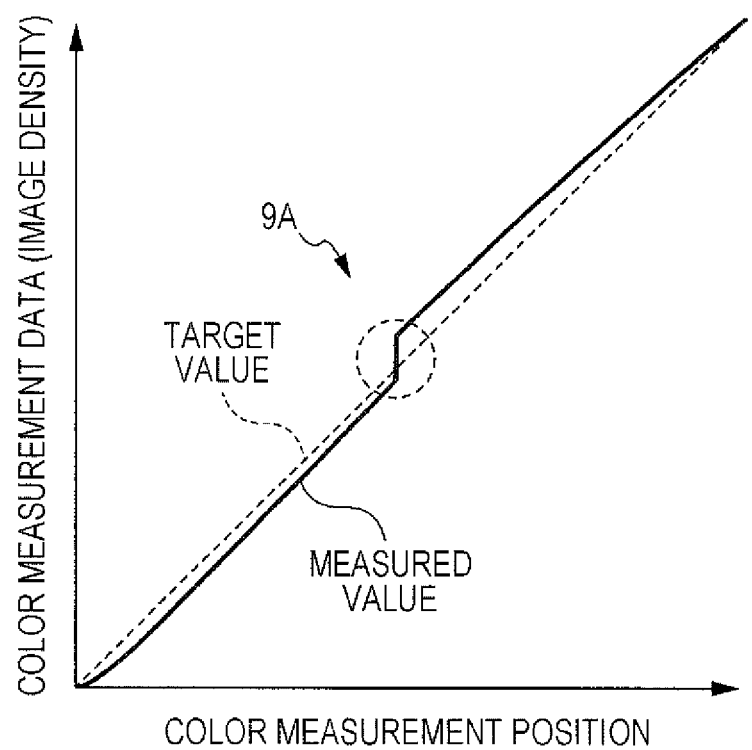
FIG. 9 is a diagram illustrating color measurement data of a color management chart in the case of judging that a gradation is not smooth.

Subsequently, in step 404, the diagnostic unit 320 ends the process in the case of judging that the gradation is smooth. On the other hand, the process proceeds to step 405 in the case of judging that the gradation is not smooth. Herein, FIG. 9 illustrates color measurement data of a color management chart in the case of judging that the gradation is not smooth. Similarly to the above, in the case of judging that the gradation is not smooth, the output value in the color measurement data changes suddenly (a tone jump occurs), as indicated by the sign 9A.

At this point, two color management charts are output in step 405. Specifically, one color management chart is output in a state in which the software calibration LUT is off and the hardware calibration LUT is on (hereinafter, this color management chart may be designated the "first color management chart"). In other words, the first color management chart is output after modifying the content of the process so as to turn off first image processing from between first image processing that is conducted using the software calibration LUT, and second image processing that is conducted using the hardware calibration LUT.

Also, one color management chart is output in a state in which the software calibration LUT is on and the hardware calibration LUT is off (hereinafter, this color management chart may be designated the "second color management chart"). In other words, the second color management chart is output after modifying the content the process so as to turn off second image processing from between first image processing that is conducted using the software calibration LUT, and second image processing that is conducted using the hardware calibration LUT.

After that, the user is instructed to measure the color of each patch on the color management charts (step 406). As a result, color measurement values obtained by measuring color on the first color management chart (hereinafter designated the "first color measurement data" in some cases), and color measurement values obtained by measuring color on the second color management chart (hereinafter designated the "second color measurement data" in some cases) are acquired.

Subsequently, the first color measurement data and the second color measurement data is used to identify the cause why the gradation is not smooth (step 407). Specifically, in step 407, the cause is judged to be the software calibration LUT, the hardware calibration LUT, or both the software calibration LUT and the hardware calibration LUT.

FIG. 10 is a diagram for illustrating details of the cause identifying process performed in step 407.

At this point, in the present exemplary embodiment, as described earlier, color measurement is conducted on the first color management chart that was output in a state in which the software calibration LUT is off and the hardware calibration LUT is on, and first color measurement data is acquired. Also, color measurement is conducted on the second color management chart that was output in a state in which the software calibration LUT is on and the hardware calibration LUT is off, and second color measurement data is acquired.

Subsequently, in step 407, the diagnostic unit 320 additionally analyzes the first color measurement data, and judges whether or not a tone jump exists in the first color measurement data (the first color management chart). In addition, the diagnostic unit 320 analyzes the second color measurement data, and judges whether or not a tone jump exists in the second color measurement data (the second color management chart).

In the present exemplary embodiment, in the case in which, as indicated by "Result 1" in FIG. 10, it is judged that a tone jump is not produced in the first color management chart (the color management chart that was output with the hardware calibration LUT turned on), while it is also judged that a tone jump is produced in the second color management chart (the color management chart that was output with the software calibration LUT turned on), the cause of the tone jump is judged to be in the software calibration LUT.

Also, as indicated by "Result 2" in FIG. 10, in the case in which it is judged that a tone jump is produced in the first color management chart while it is also judged that a tone jump is not produced in the second color management chart, the cause of the tone jump is judged to be in the hardware calibration LUT.

Furthermore, as indicated by "Result 3" in FIG. 10, in the case in which it is judged that a tone jump is not produced in the first color management chart while it is also judged that a tone jump is likewise not produced in the second color management chart, the cause of the tone jump is judged to be in both the software calibration LUT and the hardware calibration LUT.

At this point, if the software calibration LUT and the hardware calibration LUT are each turned on alone, only small jumps (tone jumps that do not reach the level of being detected as an inexpedience) may be produced, whereas if the software calibration LUT and the hardware calibration LUT are both turned on, a tone jump at the level of being detected as an inexpedience may be produced.

In other words, in some cases a small tone jump produced because of the software calibration LUT and a small tone jump produced because of the hardware calibration LUT may combined (interfere) and produce a tone jump at the level of being detected as an inexpedience. With the process described in FIGS. 8A to 10, the cause of a tone jump produced by such combining is also grasped.

Returning to FIGS. 8A and 8B, the processing in step 408 and thereafter will be described.

In the processing of step 408, the diagnostic unit 320 judges whether or not the cause of the non-smooth gradation is in the software calibration LUT only. Subsequently, in the case of judging that the cause is in the software calibration LUT only (the case of judging "Result 1" in the above step 407), an instruction to recreate the software calibration LUT is sent (step 409), and the process ends. As a result, the software calibration LUT is updated to a new software calibration LUT.

On the other hand, in the case of not judging in step 408 that the cause of the non-smooth gradation is in the software calibration LUT only, the diagnostic unit 320 judges whether or not the cause of the non-smooth gradation is in the hardware calibration LUT only (step 410). Subsequently, in step 410, in the case of judging that the cause is in the hardware calibration LUT (the case of judging "Result 2" in the above step 407), an error indicating that a malfunction has occurred in the image forming unit 110 is displayed via the UI provided in the image forming device 100 or the like (step 411), and the process ends.

On the other hand, in the case of not judging in step 410 that the cause is in the hardware calibration LUT only, or in other words, in the case in which the cause is in both the software calibration LUT and the hardware calibration LUT (the case of judging "Result 3" in the above step 407), the instruction unit 330 outputs an instruction to recreate the software calibration LUT (step 412). After that, the time at which the series of processing from step 401 to step 412 was conducted (the time at which the combined tone jump described above was produced) is stored in the information storage unit 310 (step 413), and the process ends.

Note that the reason for recreating the software calibration LUT only (the reason for conducting step 412 only and not recreating the hardware calibration LUT) even though the cause is in both the software calibration LUT and the hardware calibration LUT is that while the software calibration LUT may be recreated by software processing, recreating the hardware calibration LUT may include making hardware adjustments. Consequently, a process to recreate the software calibration LUT only may be conducted easily.

In other words, in the case in which the hardware calibration LUT is the cause of a tone jump, part of the hardware may be malfunctioning, and if a hardware calibration LUT is simply reacquired, the cause of the tone jump may still remain. For this reason, in the present exemplary embodiment, when the cause is in both the software calibration LUT and the hardware calibration LUT, only the software calibration LUT is recreated, as described above. Note that this same reasoning is why in step 411, the hardware calibration LUT is not recreated and only an error is displayed.

Note that in the example illustrated in FIGS. 8A to 10, when searching for the cause of an image quality inexpedience (the cause of a tone jump), the software calibration LUT and the hardware calibration LUT are turned on/off. In other words, one process and another process included in multiple processes are respectively turned on or off. However, the configuration is not limited to such on/off operation, and the cause of an inexpedience as above that is produced by a combination of factors may also be identified by varying processing parameters of the individual processes on a per-process basis.

For example, even in the example illustrated in FIGS. 7A and 7B, a combination of factors may cause an image quality inexpedience (banding) that exceeds an acceptable level. Specifically, for each of an image quality inexpedience (banding) produced only by a charging process by the charging device and an image quality inexpedience (banding) produced only by an exposure process by the exposure device, the level of banding may be low, but when both are combined, a high level of banding may be produced.

In such cases, for example, the case in which the level of banding decreases (the banding is no longer detected) when the voltage applied during the charging process is decreased, or in the case in which the level of banding decreases (the banding is no longer detected) when the exposure energy during the exposure process is decreased, it becomes possible to judge that the cause of the banding is in both the charging process and the exposure process.

The foregoing thus describes processes according to the present exemplary embodiment. In the present exemplary embodiment, by modifying a processing parameter of a partial process included in multiple processes conducted when forming an image, or by disabling the partial process, the cause of an inexpedience produced in an image formed by the image forming device 100 is identified.

Specifically, the cause of an inexpedience is identified by turning off the color conversion profile to disable color conversion, by modifying the frequency of the AC component of the voltage applied during charging, or by turning the software calibration LUT and the hardware calibration LUT on/off. However, the specific processes described in the foregoing, such as turning off the color conversion profile, are merely one example, and even for a process other than the processes described in the foregoing, a cause that produces an inexpedience may become identifiable by turning that process on/off or varying a processing parameter thereof.

In addition, the process described in the foregoing that modifies a processing parameter of a partial process or disables a partial process also includes the case of performing the process by simulation. In other words, the above process that disables (turns off) a partial process or modifies the content of the partial process may be performed by simulation, and not actually carried out.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cause identifying device comprising:
    a modifying unit that, in a case in which an inexpedience is detected in an image formed on a print medium by conducting a plurality of processes, conducts a first modification of processing content that modifies only a processing parameter of a first process or disables only the first process from among a first process and a second process included in the plurality of processes conducted during image formation, and a second modification of procesing content that modifies only a processing parameter of the second process or disables only the second process; and
    an identifying unit that, in a case in which an inexpedience is detected in an image formed on the print medium by an image formation conducted after the first modification is conducted, and in addition, an inexpedience is not detected in an image formed on the print medium by image formation that is conducted after the second modification is conducted, identifies a cause of the inexpedience as only in the first process.

2. The cause identifying device according to claim 1, wherein
    in a case in which the inexpedience is detected, the modifying unit modifies a processing parameter of partial image processing or disables partial image processing included in a plurality of image processing applied to image data acting as the basis of the image.

3. The cause identifying device according to claim 1, wherein
    in a case in which the inexpedience is detected, the modifying unit modifies an operating parameter of a partial mechanism or suspends operation of the partial mechanism from among a plurality of mechanisms constituting an image forming unit that forms an image on a print medium.

4. The cause identifying device according to claim 1, wherein the modifying unit modifies a frequency of an alternating current of an alternating current component of a voltage applied to a photoreceptor drum by a charging device to determine whether the inexpedience is caused by the photoreceptor drum or the charging device.

5. The cause identifying device according to claim 1, wherein the identifying unit determines the cause of the inexpedience to be image processing performed using one of a software calibration look-up table or a hardware calibration look-up table based on analyzing color management charts, such that the software calibration look-up table or the hardware calibration look-up table is selectively controlled based on the cause of the inexpedience.

6. A cause identifying device comprising:
    a modifying unit that, in a case in which an inexpedience is detected in an image formed on a print medium by conducting a plurality of processes, conducts a first modification of processing content that modifies only a processing parameter of a first process or disables the first process from among a first process and a second process included in the plurality of processes conducted during image formation, and a second modification of processing content that modifies only a processing parameter of the second process or disables the second process, and
    an identifying unit that, in a case in which an inexpedience is not detected in an image formed on a print medium by image formation conducted after the first modification is conducted, and in addition, an inexpedience is not detected in an image formed on a print medium by image formation conducted after the second modification is conducted, identifies a cause of the expedience as the identifying unit judges that the cause is in both the first process and the second process.

7. An image forming device comprising:

an image forming unit that forms an image on a print medium by conducting a plurality of processes that include image processing;

a modifying unit that, in a case in which an inexpedience is detected in an image formed on a print medium by conducting a plurality of processes, conducts a first modification of processing content that modifies only a processing parameter of a first process or disables only the first process from among a first process and a second process included in the plurality of processes conducted during image formation, and a second modification of processing content that modifies only a processing parameter of the second process or disables only the second process; and an identifying unit that, in a case in which an inexpedience is detected in an image formed on the print medium by an image formation conducted after the first modification is conducted, and in addition, an inexpedience is not detected in an image formed on the print medium by image formation that is conducted after the second modification is conducted, identifies a cause of the inexpedience as only in the first process.

8. A non-transitory computer readable medium storing a program causing a computer to execute a process for identifying a cause, the process comprising:

modifying, in a case in which an inexpedience is detected in an image formed on a print medium by conducting a plurality of processes, by performing a first modification of processing content that modifies only a processing parameter of a first process or disables only the first process from among a first process and a second process included in the plurality of processes conducted during image formation, and by performing a second modification of processing content that modifies only a processing parameter of the second process or disables only the second process; and identifying, in a case in which an inexpedience is detected in an image formed on the print medium by an image formation conducted after the first modification is conducted, and in addition, an inexpedience is not detected in an image formed on the print medium by image formation that is conducted after the second modification is conducted, a cause of the inexpedience as only in the first process.

* * * * *